United States Patent Office 3,236,872

Patented Feb. 22, 1966

3,236,872

HEXYLENE GLYCOL PERESTER AND PEROXIDE COMPOUNDS

Thomas D. Manly, Luton, and David R. Dixon, Dunstable, England, assignors to Laporte Chemicals Limited, Luton, England, a British company No Drawing. Filed Jan. 8, 1963, Ser. No. 249,995
Claims priority, application Great Britain, Jan. 12, 1962, 1,249/62
8 Claims. (Cl. 260—453)

This invention relates to peroxy compounds and is concerned with organic peroxides. The invention provides novel peroxides (which term is used herein to include hydroperoxides) of 2-methyl pentan-2, 4-diol, hereinafter called for convenience "hexylene glycol."

The hexylene glycol peroxides provided by the invention have the general formula:

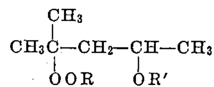

wherein R is a hydrogen atom, an acyl, aroyl, or alkyl group, especially the t-butyl, t-amyl or the hexylene glycol residue ($CH_3CHOR'\cdot CH_2\cdot C(CH_3)_2$—); and R′ is a hydrogen atom or an acyl, aroyl, or alkyl group.

Six such peroxides are (a) hexylene glycol hydroperoxide (R=R′=H), (b) hexylene glycol benzoate perbenzoate (R=R′=COPh), (c) hexylene glycol t-butyl peroxide (R=t-butyl, R′=H, (d) dihexylene glycol peroxide (R=hexylene glycol residue, R′=H), (e) t-butyl peroxy hexylene glycol benzoate (R=t-butyl, R′=COPh) (otherwise named monobenzoyl hexylene glycol t-butyl peroxide) and (f) hexylene glycol acetate peracetate (R=R′=$COCH_3$).

It has been found that conventional methods for the production of organic peroxides give very poor results when applied to the manufacture of the peroxides of the present invention. It has now been found that by "protecting" the secondary alcoholic group of the glycol a more useful process becomes possible for the production of the peroxides according to this invention.

Thus, the invention further provides a process for the production of hexylene glycol peroxides having the general formula shown above in which formula R is a hydrogen atom or an alkyl group, especially t-alkyl (e.g., t-butyl or t-amyl), and R′ is an acyl, aroyl, or alkyl, which comprises the step of reacting the secondary alcoholic group of the hexylene glycol with a reactant such as an acyl or aroyl halide or an alkylating agent, the reactant and reactant and reaction conditions being so chosen that substantially no reaction occurs with the tertiary alcoholic group of the glycol; and the step of reacting, in the presence of strong acid, the product thus obtained with either hydrogen peroxide (whereby R=H) or t-alkyl (e.g., t-butyl or t-amyl) hydroperoxide (whereby R=t-alkyl e.g., t-butyl, etc.). Under normal conditions during the acylation and treatment with hydrogen peroxide the secondary alcoholic group will be reacted to the substantial exclusion of the tertiary group. Suitable strong acids for use in the peroxidation step are sulphuric and phosphoric acids.

A peroxide in which R=R′=H, can be obtained by conducting the steps of the process described in the previous paragraph, employing hydrogen peroxide, and thereafter carefully hydrolysing (for example, with a dilute caustic soda solution) the resulting hexylene glycol ester hydroperoxide, to form hexylene glycol hydroperoxide. If in this latter general procedure the molar ratio of hydrogen peroxide is appropriately reduced then a product can be obtained with R′=H and R=hexylene glycol residue. A peroxide in which R is acyl, aroyl or alkyl, and R′ is acyl, aroyl, or is alkyl, can be obtained by conducting the steps of the process described in the previous paragraph, employing hydrogen peroxide, and then reacting the peroxide thus formed with a suitable esterifying agent, such as acetyl or benzoyl chlorides; or a suitable alkylating agent, for example an alkyl sulphate or alkyl toluene sulphonate each in the presence of alkali.

However, even with these processes the yields of product obtained although useful, are reduced due to the acid conditions leading to hydroylsis of the "protective" ester group and even to breakdown of the glycol itself.

However, this disadvantage can be overcome or mitigated in accordance with a preferred feature of the invention in which the above described processes are modified by conducting the step involving hydrogen peroxide or t-alkyl (e.g., t-butyl) hydroperoxide as an azeotropic distillation under mildly acidic conditions in the presence of a solvent mixture which forms an azeotrope with water. Benzene is one especially suitable solvent. The mildly acidic conditions can be achieved by employing an acidic ion-exchange resin, since normally, the resin alone is sufficient to produce the required conditions. Alternatively sulphonic acid, for example, p-toluene sulphonic acid, can be employed. It will be appreciated that in this process the products obtained when using hydrogen peroxide can for example be esterified to give a desired grouping.

Using this technique, it is no longer necessary (other than in the case mentioned below) to esterify the secondary alcohol group prior to reaction, and it becomes possible directly to prepare the simple hydroperoxide (from hydrogen peroxide) and peroxide (for example, from t-butyl hydroperoxide) of hexylene glycol itself. However, esterification of the sec. alcohol group enables peroxides to be prepared from a wide variety of hexylene glycol monoesters and so provides a source of numerous peroxides the properties of which may be advantageously influenced by selection of the ester group used. Alternatively, the sec. alcohol group can be alkylated, e.g., methylated. It may be possible to react it so as to replace it by, e.g., an —$NH_2$, —CN, or —Cl; the substituents employed may be such as will be inert to the peroxidic reagents to be used, or otherwise may be such as will intentionally be oxidised, a sufficient additional quantity of peroxide being used to effect any such oxidation.

If in the desired peroxide R and R′ are not H and are to be different then it will still be necessary to esterify (or alkylate etc.) the sec. alcoholic group before reaction with hydrogen peroxide or t-butyl peroxide. When hydrogen peroxide is used the resultant product can be further esterified to give a desired grouping. However, if R and R′ are to be the same then it is possible first to produce the hydroperoxide as mentioned in the previous paragraph and then esterify the sec. alcohol and hydroperoxide groups in one step employing two or more equivalents of a suitable reagent (for example benzoyl chloride if R and R′ are to be —COPh).

Suitable hydroperoxides other than t-butyl can be employed in processes according to this invention, for example, t-amyl hydroperoxide, ethyl hydroperoxide and 2,5-dimethyl hexane-2,5-dihydroperoxide.

The invention thus provides a considerable number of hexylene glycol peroxides in which R and R′ can be widely varied with consequent varying of for example molecular weight and volatility, and renders possible the provision of a peroxide with properties "tailored," to some degree at least, to the particular purpose for which it is to be used.

Thus, for instance, an application of organic peroxides is in the cross-linking of substantially saturated polymers such as polyethylene, polypropylene and silicone rubbers where free radical generation at temperatures of the order of 150° C. is desirable. Other applications also require such high temperature reactivity, for example the styrenation of alkyds and the moulding of polyesters. Di-t-butyl peroxide functions in this temperature range, but since it has a boiling point of 109° C. its use is restricted to those applications where significant pressure can be applied. Dicumyl peroxide can be used at this temperature range but produces acetophenone on a decomposition, which remains in the polymer producing an undesirable odour. Now, for instance, the hexylene glycol hydroperoxide and the t-butyl peroxy hexylene glycol benzoate of the present invention are effective in the same temperature range, are much less volatile and produce little or no undesirable by-products. The employment of a peroxide according to this invention especially t-butyl peroxy hexylene glycol benzoate, in the aforesaid cross-linking reaction is envisaged as within the scope of the present invention.

The following examples illustrate processes in accordance with the invention.

*Example 1.—t-Butyl peroxy hexylene glycol benzoate:* (R=*t-butyl,* R′=COPh)

280 g. (2.0 mols) of benzoyl chloride were added over a period of 2 hours at 20 to 45° C. to a mixture of 236 g. hexylene glycol (2.0 mols) and 180 g. pyridine. After 18 hours the mixture was well washed to remove pyridine, salts and unreacted glycol and distilled—B.P. 170 to 176° C. at 20 mm. Hg. 45 g. of the ester was mixed with 48 g. of 75% t-butyl hydroperoxide and 10 g. of 70% sulphuric acid was added slowly. After a reaction time of 2½ hours the acid was neutralised with sodium bicarbonate solution, the product dried over calcium sulphate, and unreacted t-butyl hydroperoxide and di-t-butyl peroxide removed under vacuum. Yield 25 g. (42%) of a peroxide with an available oxygen content of 3.5% (theoretical 5.4%) as di-t-alkyl peroxide. (Av. oxygen due to hydroperoxide content 0.8%.)

*Example 2.—Hexylene glycol hydroperoxide:* (R=R′=H)

90 g. of Zeocarb 225 (acid form) ion exchange resin was added to a mixture of 120 g. (3.0 mols) of 85% hydrogen peroxide, 236 g. (2.0 mols) hexylene glycol and 400 g. of benzene. The benzene/water azeotrope was removed at 40° C. at a pressure of 350 mm. Hg, the benzene being separated and returned to the reactor. Although the theoretical quantity of water to be removed was 54 g., a total of 62 g. was in fact removed, corresponding to some dialkyl peroxide formation. After removal of the remaining benzene a product (220 g.) was obtained which by iodometric analysis consisted of about 73% hexylene glycol hydroperoxide and 25% dihexylene glycol peroxide.

*Example 3.—Hexylene glycol benzoate perbenzoate:* (R=R′=$COC_6H_5$)

67 g. (0.35 mol) of the hydroperoxide prepared as described in Example 2 was dissolved in 300 g. of 20% NaOH sol (1.5 mols) and 140 g. (1 mol) of benzoyl chloride added with stirring and while cooling to below 30° C. After 3 hours the organic phase which had formed was separated, washed with dilute alkali and dried to yield 60 g. of the benzoate perbenzoate.

*Example 4.—Dihexylene glycol peroxide:* (R=*hexylene glycol residue,* R′=H)

This was prepared in the general manner of Example 2, but in this case 236 g. (2.0 mols) of glycol being reacted with 50 g. (1.2 mols) of 85% $H_2O_2$. 64 g. of water was removed as azeotrope and 224 g. of the product were obtained.

*Example 5.—Hexylene glycol t-butyl peroxide:* (R=*t-butyl,* R′=H)

This was prepared in the general manner of Example 2; 236 g. of glycol being reacted with 240 g. (2 mol) of 75% t-butyl hydroperoxide. A total of 63 g. of water was removed, including a quantity contained in the t-butyl hydroperoxide used. After removal of the benzene and di-t-butyl peroxide at reduced pressure a yield of 220 g. of the required peroxide was obtained.

*Example 6.—Hexylene glycol acetate peracetate:* (R=R′=$COCH_3$)

50 g. of the hydroperoxide prepared as described in Example 2 was dissolved in 100 ml. ether and 80 g. pyridine, 75 g. acetyl chloride was added slowly whilst maintaining the temperature at 5° C. After 3 hrs. the reaction mixture was added to 100 ml. water+100 ml. 10% HCl. The organic phase was separated and washed with 100 ml. of 10% $Na_2CO_3$ solution and the product finally washed twice with water. The yield of hexylene glycol acetate peracetate was 17 g.

What we claim is:

1. Hexylene glycol peroxides having the general formula:

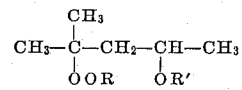

wherein R is a radical selected from the group consisting of hydrogen, acetyl, benzoyl, lower alkyl and the hexylene glycol residue ($CH_3CHOR'.CH_2.C(CH_3)_2$—); and R′ is a radical selected from the group consisting of hydrogen, acetyl, benzoyl and lower alkyl.

2. A hexylene glycol peroxide as claimed in claim 1, wherein R is t-butyl.

3. Hexylene glycol hydroperoxide.

4 Hexylene glycol benzoate perbenzoate.

5. Hexylene glycol t-butyl peroxide.

6. Dihexylene glycol peroxide.

7. t-Butyl peroxy hexylene glycol benzoate.

8. Hexylene glycol acetate peracetate.

References Cited by the Examiner

UNITED STATES PATENTS

| | | | |
|---|---|---|---|
| 2,996,549 | 8/1961 | Mageli et al. | 260—610 |
| 3,082,236 | 3/1963 | Mageli et al. | 260—453 |
| 3,086,996 | 4/1963 | Mageli et al. | 260—610 |

CHARLES B. PARKER, *Primary Examiner.*

IRVING MARCUS, *Examiner.*